United States Patent [19]

Michel

[11] 3,974,027
[45] Aug. 10, 1976

[54] NUCLEAR REACTOR INSTALLATION
[75] Inventor: Eberhard Michel, Nurnberg, Germany
[73] Assignee: Siemens Aktiengesellschaft, Munich, Germany
[22] Filed: Apr. 25, 1974
[21] Appl. No.: 464,238

[30] Foreign Application Priority Data
Apr. 30, 1973 Germany............................ 2321846

[52] U.S. Cl. .................................. 176/38; 176/87; 176/DIG. 2
[51] Int. Cl.² ........................................ G21C 11/08
[58] Field of Search ................... 176/87, 38, DIG. 2

[56] References Cited
UNITED STATES PATENTS

| | | | |
|---|---|---|---|
| 3,398,050 | 8/1968 | Yevick et al........................ | 176/87 X |
| 3,436,544 | 4/1969 | Graf, Jr............................. | 176/87 X |
| 3,633,784 | 1/1972 | Taft .................................. | 176/87 X |
| 3,744,660 | 7/1973 | Gaines et al....................... | 176/87 X |
| 3,823,066 | 7/1974 | Thome.............................. | 176/87 X |

*Primary Examiner*—Samuel W. Engle
*Assistant Examiner*—Peter A. Nelson
*Attorney, Agent, or Firm*—Kenyon & Kenyon Reilly Carr & Chapin

[57] ABSTRACT

A pressurized-water reactor installation comprises a metal pressure vessel surrounded by a concrete wall forming an annular space around the vessel so that the vessel's side wall can be inspected by instrumentation lowered within the space. To provide the vessel with rupture protection, its side wall is encircled by cylindrical segments of pressure-resistant, heat-insulating material, the segments being themselves encircled by high-tensile strength elements. These parts are proportioned so that when the reactor vessel thermally expands, the segments are placed in compression under the restraint of the high-tensile encircling elements which remain cooler than the vessel, and when the vessel is at room temperature, the segments are free from compression and can be removed to clear the annular space around the vessel's side wall and permit use of the instrumentation for the side wall inspection.

3 Claims, 2 Drawing Figures

NUCLEAR REACTOR INSTALLATION

BACKGROUND OF THE INVENTION

A nuclear power plant using a pressurized-water reactor comprises a pressure vessel having a vertically substantially cylindrical side wall and containing the reactor core through which the pressurized-water coolant is circulated. The vessel's side wall has inlet and outlet coolant connections radiating from its upper portion, these outlet connections via pipes connecting with the heat exchangers of steam generators and from which pipes extend back via main coolant pumps to the vessel's inlet connections.

The pressure vessel is surrounded by a concrete wall formed by concrete defining a pit in which the vessel is positioned. The relative diameters of the two walls are such as to define an annular space between the two so as to accommodate instrumentation lowered into the pit for inspection of the pressure vessel's side wall condition.

In prior art installations this concrete wall has been designed to function not only as biological protection but also to contain missile-like fragments of the pressure vessel in the event its side wall ruptures under the pressure of the pressurized-water coolant circulating within the vessel. Therefore, the concrete construction has required expensive reinforcement, but because of the annular space, the concrete wall has been unable to function to reinforce the vessel's side wall against rupturing.

The coolant pipes extending to and from the steam generators also contain the pressurized-water coolant and the steam generators must operate under the internal pressure of the generated steam. These components are also surrounded by concrete walls, but in this instance the walls are spaced substantial distances from the components. This has made it possible to provide the steam generators and coolant pipes with rupture protection in the form of pressure-resistant and heat-resistant concrete segments which are interfitted to surround the components and which are themselves surrounded by high-tensile metal annular elements. In this way rupure protecting encasements are provided for these components, the encasement parts being relatively proportioned so that when the steam generators and coolant pipes are thermally expanded by their normal operating temperatures, the high-tensile metal annular elements, which remain cooler, resist the expansion, the result being that the high-compression strength segments are compressed against the walls of the steam generators and pipes to relieve them of a substantial amount of the stress resulting from their confinement of the high-pressure fluids. Such rupture protection for the steam generators and coolant pipes has been disclosed and claimed in the U.S. Michel et al. patent application Ser. No. 417,798, filed Nov. 21, 1973.

Now the previously described annular space between the reactor pressure vessel's side wall and its surrounding concrete wall must be small enough in radial extent to ensure containment of possibly flying fragments of the side wall in the event the latter should rupture under its internal pressure. Therefore, there is no room for working personnel and thus it has heretofore been impossible to encase the pressure vessel's side wall in the same manner as done in the case of the steam generators and coolant pipe lines. If the encasement were to be built on the vessel prior to its installation in its concrete pit, the encasement would fill up the annular space required to inspect the condition of the pressure vessel's side wall.

SUMMARY OF THE INVENTION

The primary object of the present invention is to provide the pressure vessel with a rupture protecting encasement having the advantages of the encasements which can be used on the steam generators and coolant pipes, while providing for clearance of the annular space between this pressure vessel's side wall and its surrounding concrete wall when pressure vessel side wall inspection is desired. The concrete wall must have holes for the passage of the coolant pipes to and from the pressure vessel and if the described prior art encasement construction is applied to the pipe portions which must pass through the concrete wall, the holes in this wall must be undesirably large. Therefore, another object of the present invention is to provide these pipe portions with rupture protection without requiring their passage holes through the concrete wall to be undesirably large in diameter.

The usual pressurized-water reactor pressure vessel side wall does not have a uniform diameter throughout its height. At least its upper portion is of enlarged diameter relative to its portions therebelow, because the wall thickness of the upper portion is increased in the area of the coolant pipe connections to prevent them from materially reducing the side wall's radial and axial strength in that area. This characteristic, plus of course, the radially extending coolant pipes, eliminate any concept of an encasement that is vertically slidable on the pressure vessel's side wall.

However, in accordance with the present invention, radially superimposed layers of individually separable, segmentally cylindrical segments are interfitted to form a substantially cylindrical shell enclosing the vessel's side walls. These segments are made of the pressure-resistant, heat-insulating material and are arranged to not only provide a plurality of layers which are subdivided in the radial direction of the vessel's side wall, but also layers which are subdivided in the axial direction of the vessel's side wall.

The high-tensile strength metal elements, normally steel, are in the form of cylindrical rings which are stacked end-to-end and form, in effect, a metal wall surrounding the layers of segments. Those of these rings which are below the vessel's coolant connections are positioned prior to the vessel being installed in its pit. One of these rings, or possibly several, are positioned above the coolant pipe connections of the vessel's side wall and can be installed and removed at any time the reactor is shut down. The segments are appropriately shaped and laid to contact the vessel's side wall throughout, including both the upper portion of larger diameter and all lower portions, and the segments can be laid and removed at any time when the reactor is shut down. When the encasement is completed, with the reactor of course in a shut-down condition, start-up of the reactor, with consequent thermal expansion of the pressure vessel's side wall, places the layers of segments in compression because their surrounding metal cylinders remain cooler and, therefore, thermally expand to a lesser degree than the pressure vessel's side wall.

The new encasement substantially fills the previously referred to annular space and prevents the use of this space for vessel side wall inspection purposes. However, when the reactor is shut-down and its pressure vessel is at or near room temperature, the encasement parts are free from stress, the segments and cylinders being dimensioned to assure this condition. Then the metal cylinder or cylinders above the coolant pipes of the pressure vessel, may be lifted upwardly out of the annular space, and the outermost layer or layers of the segments may then be removed, thus providing clearance in the radial direction for removal and upward lifting of the segments of the layer or layers beneath the upper portion of the vessel having the larger diameter. In this way the entire encasement, with the exception of the metal cylinders below the coolant pipes, may be removed from the annular space. Being made of high-tensile strength metal, such as steel, these cylinders may have a wall thickness small enough to provide room between their inner surfaces and the pressure vessel's side wall for the insertion of any instrumentation normally required for the inspection of the vessel's side wall. Re-installation of the encasement is, of course, only the reverse of the described procedure.

The rupture protection for the coolant pipes is provided in the form of closely interspaced high-tensile strength metal rings which encircle these pipes. The rings are preferably made from rectangular metal bar stock, preferably square in cross section, having a thickness at least equal to the wall thickness of the coolant pipes. In addition, these rings are spaced from each other a distance about equal to their thickness. Their compactness avoids the need for undesirably large pipe passages through the concrete construction.

BRIEF DESCRIPTION OF THE DRAWINGS

The presently preferred mode for carrying out the invention is schematically illustrated by the accompanying drawings, in which.

DETAILED DESCRIPTION OF THE INVENTION

Figure 1:
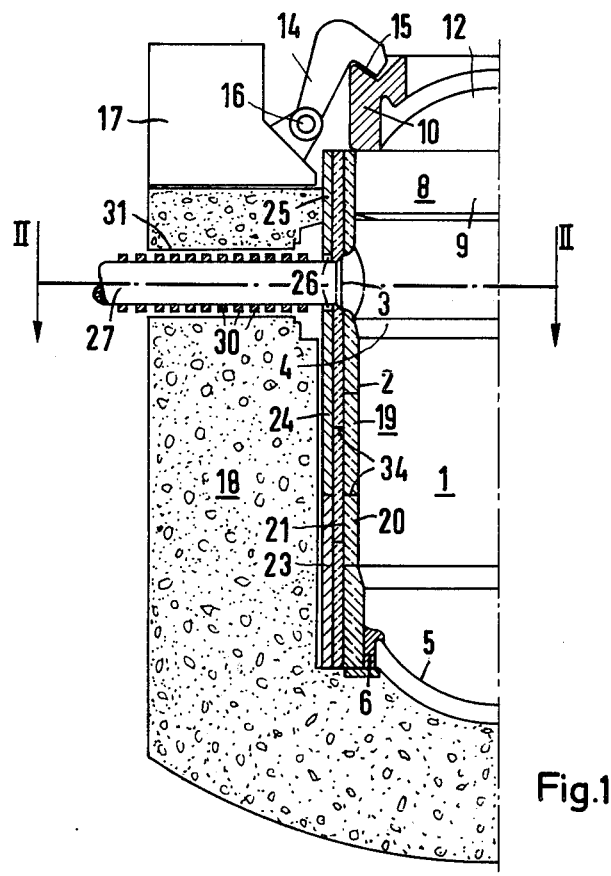
FIG. 1 shows one-half of the pressure vessel and concrete wall, these parts being cylindrical and symmetrical about their axes, the pressure vessel and one of its coolant pipes being shown in elevation and the concrete wall and the new encasement being shown in vertical section.

As illustrated, the pressure vessel 1 has a major portion 2 of its side wall in the form of a cylinder of uniform diameter, the radiating coolant pipe connections or nozzles 3 extending, however, from the upper side wall portion 4 of thicker wall diameter and, therefore, having the larger outside diameter than the portion 2. The spherical bottom 5 of the vessel has a peripheral portion resting on a support 6. The pressure vessel has a head 8 held down on top of the pressure vessel flange 9 by a mounting ring 10, the head having a spherical top 12, closing the top of the pressure vessel. The ring 10 is secured by hinge hooks 14 which engage the ring via a declining surface 15 in a self-locking manner. The hook hinge pins 16 are anchored to the upper part 17 of the concrete biological shield 18 which forms the concrete wall surrounding the pressure vessel side wall. It is this biological shield that forms the concrete pit in which the pressure vessel 1 is supported via its support 6.

The encasement of this invention is generally indicated at 19. This encasement is built in the form of a shell comprising an inner layer 20 of the segmental cylindrical segments of pressure-resistant, heat-insulating material, and an outerlayer 21 made of similar segments. These segments or blocks are shaped so that the inner layer 20 engages the pressure vessel's side wall, including its portion 2 and 4, throughout the height of this side wall. The stack of segments forming the layer 20 below the side wall portion 4 are thicker than the segments contacting the portion 4, so that the outer surface of the layer 20 forms a cylinder of uniform diameter throughout, and on this layer is stacked the segments of the layer 21. As to both layers, there are a plurality of the segments both circumferentially and vertically and the segments are separable from each other. The inner surface of the layer 21 is shaped to conform exactly to the contour of the outside of the pressure vessel's side wall. By appropriately shaped segments, this includes the side of the bottom 5 which is of smaller diameter than the portion 2.

The above segments or blocks may be made from a gas-containing concrete which has a specific gravity of 1.75 g/cm$^3$ or, in other words, of so-called Leca concrete. The total thickness of both of the layers 20 and 21 may be in the neighborhood of 400 to 500 mm. The inner and outer surfaces of the layer 21 are, of course, both cylindrical and of uniform diameters throughout their lengths.

The high-tensile strength steel cylinders are shown at 23, 24 and 25 and each extend over about ⅓ of the axial height of the pressure vessel side wall. However, a finer subdivision of the cylinders may be used if considered desirable from the fabrication and handling viewpoints. These rings are stacked end to end to form a substantially complete cylindrical wall.

The top one of the rings 25 is formed with cutouts 26 to provide clearance for the coolant pipes 27 and, although only one of these pipes is shown, it is to be understood that a plurality of these pipes radiate from the vessel's portion 4. This permits the ring 25 to be lifted when the pressure vessel's cover has been removed and the hooks 14 swing out of the way. After this ring 25 is removed, the segments may be removed piece by piece, using simple manipulation worked from above the vessel's pit. The segments surrounding the coolant pipes 27 and the connections or nozzles 3 must also have cutouts to provide the necessary clearance. However, after removal of the segments above the pipes, and their connections or nozzles, removal of the segments on either side of the pipes and connections provide clearance for removal of the segments below these obstructions. Removal of the segments of the layer 21 upwardly from the annular space, then permits the segments of the layer 20 to be moved radially outwardly as required to clear the portion 4 of enlarged diameter, including any other shouldered parts such as at the junction between the lower vessel portion 5 and the balance of the vessel, and be then also removed upwardly.

As previously indicated, the proportions of the segments and the steel cylinders are such that they are all loose relative to each other and the pressure vessel side wall when the pressure vessel is at or close to room temperatures, such as in the area of 20° to 40°C. When the encasement is installed and the pressure vessel expands while the steel cylinders 23, 24 and 25 remain somewhat colder, the thermal expansion of the vessel presses its side wall against the layers of segments which are then placed in compression by the reaction of the steel cylinders, thus applying the desired compressive restraint to the pressure vessel's side wall, for rupture protection.

With the encasement of the present invention, the concrete wall 18 is no longer required as a mechanical containment for the vessel and it need only be designed for biological shielding purposes. Consequently, the concrete side wall need not be provided with steel reinforcements such as have heretofore been required although it may include tension rods or cables to carry the stress from the hooks 14 to the bottom of the concrete construction.

Figure 2:
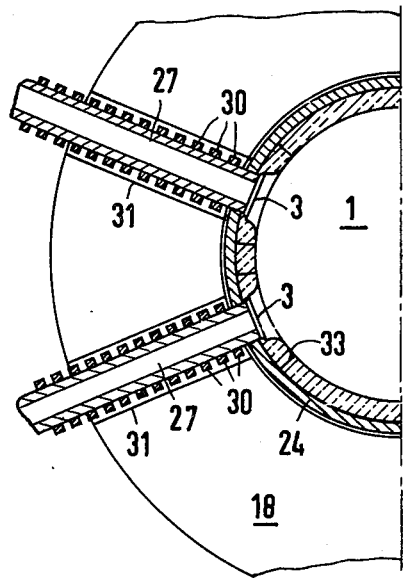
FIG. 2 is a cross section taken on the line II—II in FIG. 1.

In FIG. 2 the steel rings 30 are shown surrounding the main coolant lines 27 of which two are shown in this instance. These steel rings are mounted directly on the pipes 27 and are shown as having square cross sections and interspaced from each other a distance about equal to their thickness. The thickness of the square cross section rings should be at least equal to the wall thickness of the pipes 27. These steel rings are sufficient to prevent large pieces of the pipes 27 from becoming missles in the event of a rupture of the main coolant lines 27. At the same time the holes 31 in the concrete wall through which the pipes 27 pass, need not be made with undesirably large diameters.

FIG. 2 shows the joints 33 which extend in the vertical direction and which in conjunction with the joints 34 which extend in the horizontal direction, permit the removal of the segments as described. In other words, the two layers are subdivided both radially and axially with respect to the pressure vessel. The segments of the two layers should be of such size as to permit them to be transported and handled in a practical manner.

What is claimed is:

1. A water-cooled nuclear reactor installation comprising a metal pressure vessel having a vertical substantially cylindrical side wall having an upper portion and coolant pipes radiating from said upper portion, a concrete pit in which said vessel is positioned and forming a concrete wall surrounding said vessel at a radial distance therefrom defining an annular space around the vessel, said space when empty having a radial extent permitting instrumentation to be lowered into said space for inspecting the vessel's said side wall, said space being substantially filled by a rupture-protecting encasement for the vessel's said wall; said encasement comprising a shell formed by individual-separable segmentally-cylindrical segments interfitted to form at least one substantially cylindrical layer encasing the vessel's said side wall, said segments being made of pressure-resistant heat-insulating non-metallic material and the segments subdividing said layer in the radial and axial direction of the vessel's said side wall and said shell being encircled by high-tensile strength metal rings; said metal pressure vessel radially expanding thermally when said vessel is hot and said shell thermally insulating said metal rings against heat from said vessel so that said rings do not correspondingly thermally expand, said rings therefore applying radial compression via said shell to the vessel's said side wall to provide said rupture-protecting encasement when said vessel is hot, said metal pressure vessel thermally contracting radially when cool and said metal rings then releasing said compression, whereby to permit upward removal of said segments, segment-by-segment, when said vessel is cool, and freeing said space from said segments, to permit said inspection.

2. The installation of claim 1 in which said shell comprises a plurality of said layers which are radially superimposed relative to each other between said rings and the pressure vessel's said wall.

3. The installation of claim 1 in which said pit and wall have radial holes through which said pipes radiate, said holes having walls forming radial spaces around said pipes, the last-said spaces being substantially filled by rupture-protecting encasements for said connections, each encasement comprising interfitted individually-separable segmentally-cylindrical segments of said non-metallic material forming layers encircling said connections, and high-tensile-strength metal rings encircling the just-named layers and correspondingly applying via the just-named layers radial compression to said pipes when hot.

* * * * *